US010122265B1

(12) United States Patent
Matthew et al.

(10) Patent No.: US 10,122,265 B1
(45) Date of Patent: Nov. 6, 2018

(54) REDUCING ELECTROMAGNETIC INTERFERENCE IN SWITCHING REGULATORS

(71) Applicant: Intel Corporation, Santa Clara, CA (US)

(72) Inventors: George E. Matthew, Hillsboro, OR (US); Gerhard Schrom, Hillsboro, OR (US); Alexander Lyakhov, Portland, OR (US); Rachid E. Rayess, Hudson, MA (US); Anant S. Deval, Portland, OR (US); Sergio Carlo Rodriguez, Hillsboro, OR (US); Pushkar Dixit, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/861,604

(22) Filed: Jan. 3, 2018

(51) Int. Cl.
*H02M 1/44* (2007.01)
*H02M 3/157* (2006.01)
*H01F 27/40* (2006.01)

(52) U.S. Cl.
CPC .......... *H02M 1/44* (2013.01); *H01F 27/402* (2013.01)

(58) Field of Classification Search
CPC ......... H02M 2001/0025; H02M 3/157; H02M 2001/0012; H02M 3/156; H02M 3/158; H02M 3/1588
See application file for complete search history.

(56) References Cited

U.S. PATENT DOCUMENTS

| 6,911,808 | B1* | 6/2005 | Shimamori ........... | H02M 3/157 323/283 |
| 9,166,471 | B1* | 10/2015 | Levesque ............... | H02M 1/44 |
| 9,490,701 | B2 | 11/2016 | Matthew et al. | |
| 2007/0210776 | A1* | 9/2007 | Oka ........................ | H02M 1/44 323/283 |
| 2014/0097817 | A1* | 4/2014 | Liu .......................... | G05F 1/46 323/283 |

OTHER PUBLICATIONS

Matthew, George E. et al., "Low power all digital acoustic noise suppression technique for switching voltage regulators", Intel Labs, Intel Corporation, Hillsboro, Oregon, USA, 2015 IEEE, 6 pgs.

\* cited by examiner

*Primary Examiner* — Gary L Laxton
(74) *Attorney, Agent, or Firm* — Green, Howard, & Mughal LLP

(57) ABSTRACT

An apparatus is provided which comprises: at least two switches in series between an input voltage node and a ground terminal; an inductor coupled between a mid-point of the at least two switches and an output terminal; a first circuitry to compare a current through the inductor with a threshold current, and to control one or both of the at least two switches, based at least in part on the comparison; and a second circuitry to randomly vary the threshold current over consecutive cycles of switching of the at least two switches.

20 Claims, 9 Drawing Sheets

REDUCING ELECTROMAGNETIC INTERFERENCE IN SWITCHING REGULATORS

BACKGROUND

A voltage regulator (VR) may provide a substantially stable Direct Current (DC) output voltage, e.g., independent of a load current, temperature, variations in an input voltage, etc. In a VR, various switches (e.g., various power stage transistors) may be switched at rapid successions to regulate the output voltage. The switching may generate Electro-Magnetic Interference (EMI) and/or Radio Frequency Interference (RFI). The generated EMI, RFI may be of unpredictable frequencies, and may be worse at a specific frequency (or at a specific narrow band of frequencies), e.g., based on a specific frequency of switching in the VR. In an example where the VR is an on-chip VR, such EMI, RFI may cause interference to components within the chip, and/or to other proximal electrical components.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
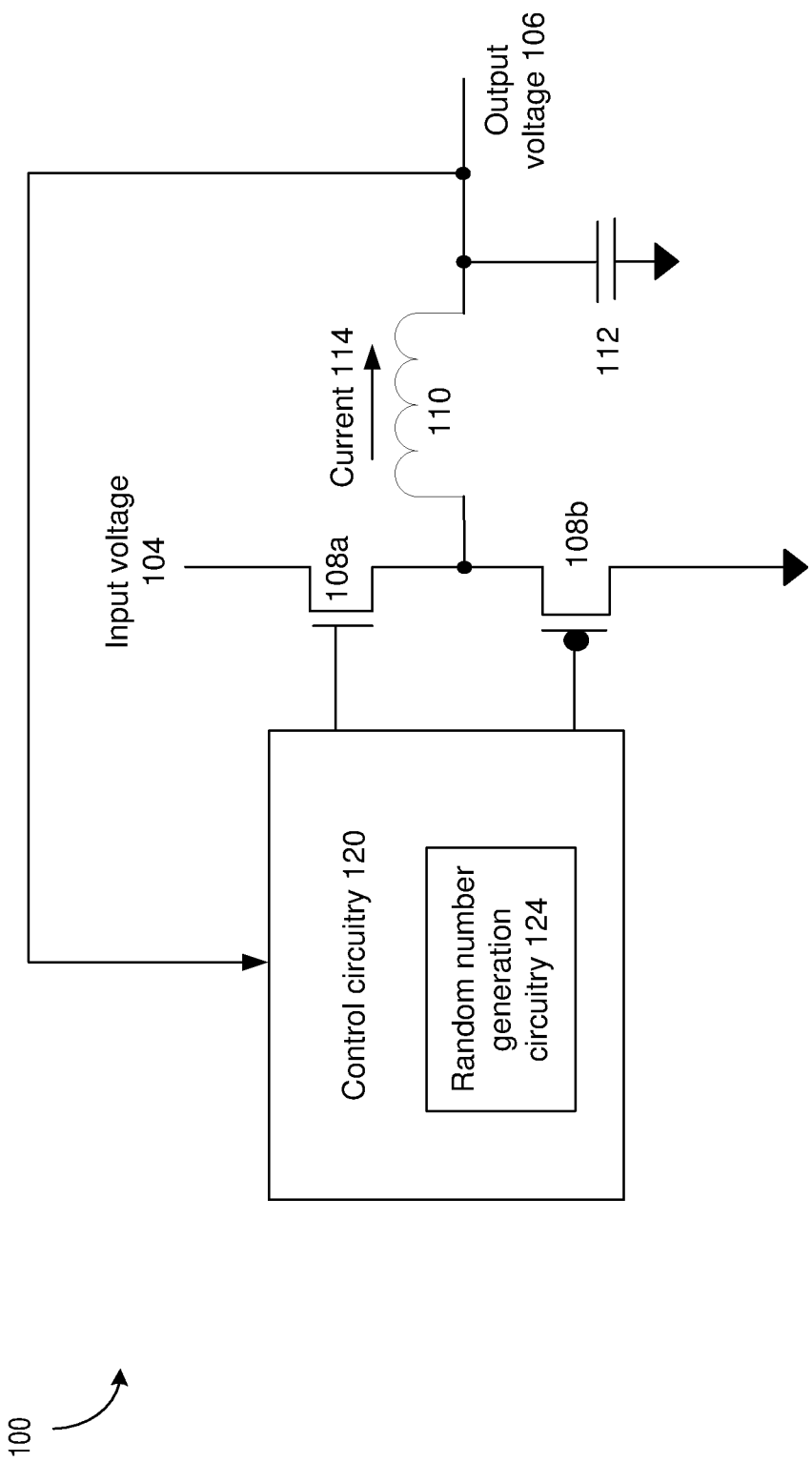
FIG. 1 schematically illustrates a voltage regulator (VR) comprising a control circuitry, wherein the control circuitry comprises a random number generator circuitry to randomize at least a part of operation of the VR, e.g., to reduce effects of EMI and RFI emanating from the switching within the VR, according to some embodiments.

In some embodiments, a voltage regulator (VR) may comprise a power stage comprising two or more switches. The power stage selectively supplies an input voltage to a load. The switching of the switches of the power stage of the VR may possibly cause EMI and/or RFI, which may be of unpredictable frequencies, and may be worse at a specific frequency (or at a specific narrow band of frequencies), e.g., based on a specific frequency of switching in the VR.

In some embodiments, to avoid such peak EMI and/or RFI at certain frequencies, a randomness is introduced in a VR. For example, in the VR, to regulate the output voltage, the output voltage and/or an inductor current (e.g., current flowing from the power stage of the VR, through an inductor, to a load of the VR) may be compared to corresponding threshold values. In some embodiments, the threshold values may be varied randomly (or in a pseudo-random manner). Such random or pseudo-random variation of the threshold values results in the switching of the power stage switches at varying frequencies. Accordingly, instead of the EMI and/or RFI being restricted to certain frequencies, the EMI and/or RFI are distributed over a large frequency range. This may reduce or eliminate the adverse effects of the EMI and/or RFI. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left." "right," "front," "back," "top," "bottom," "over," "under," and the like in the description and in the claims, if any, are used for descriptive purposes and not necessarily for describing permanent relative positions.

FIG. 1 schematically illustrates a voltage regulator (VR) 100 comprising a control circuitry 120 (also referred to as circuitry 120), wherein the circuitry 120 comprises a random number generator circuitry 124 (also referred to as circuitry 124) to randomize at least a part of operation of the VR 100, e.g., to reduce effects of EMI and RFI emanating from the switching within the VR 100, according to some embodiments. In an example, the VR 100 may be included in any appropriate computing device, e.g., a laptop, a desktop, a smart phone, a television, a tablet, a set-top box, or any appropriate computing device that is to receive a power supply from a VR.

In some embodiments, the VR 100 may comprise two or more series connected switches, e.g., switches 108a and 108b, where the switches 108a and 108b are implemented as two respective transistors in FIG. 1 merely as an example. A first terminal of the switch 108a receives an input voltage 104, and a second terminal of the switch 108a is coupled to a first terminal of the switch 108b. A second terminal of the switch 108b may be coupled to a ground terminal. The switches 108a and 108b form a power stage of the VR 100.

A node between the switches 108a and 108b may be coupled to a L/C filter (e.g., inductor/capacitor filter) comprising an inductor 110 and a capacitor 112. For example, the node between the switches 108a and 108b may be coupled to a first end of the inductor 110. A second end of the inductor 110 may be grounded via the capacitor 112.

The second end of the inductor 110 may output an output voltage 106. For example, a load (not illustrated in FIG. 1) may be coupled between the output voltage 106 and the ground. A current from the power stage (e.g., comprising the switches 108a and 108b), through the inductor 110, to the load is referred to as a current 114 (also referred to as inductor current 114, or a load current).

The VR 100 may comprise a feedback loop, where a measure of the output voltage 106 may be feedback to the circuitry 120. In some embodiments, the circuitry 120 may be a digital circuitry, and the output voltage 106 may be measured using an Analog to Digital Converter (ADC, not illustrated in FIG. 1), before being transmitted to the circuitry 120.

Although not illustrated in FIG. 1, in some embodiments, a feedback of the inductor current 114 may also be provided to the circuitry 120. For example, when the operation of the circuitry 120 is based at least in part on the inductor current 114, such a feedback of the current 114 may be provided to the circuitry 120.

The circuitry 120 controls the switching of the switches 108a and 108b. For example, the circuitry 120 may control the timing of the switching of the switches 108a and 108b, e.g., based on by receiving the feedback measurements of the output voltage 106 and/or the current 114. By controlling the timing of the switching of the switches 108a and 108b, the circuitry 120 can control or regulate the output voltage 106.

In an example, the switch 108a is also referred to as a high side switch or a high side FET (field effect transistor), as the switch 108a selectively (e.g., depending on the switching signal received from the circuitry 120) supplies the input voltage 104 to the L/C filter comprising the inductor 110 and the capacitor 112. In an example, the switch 108b is also referred to as a low side switch or a low side FET, as the switch 108b selectively (e.g., depending on the switching signal received from the circuitry 120) grounds an end of the L/C filter.

In some embodiments, the output voltage 106 may be less than the input voltage 104 (e.g., the ratio of the output voltage 106 and the input voltage 104 may be less than one). Thus, the VR 100 illustrated in FIG. 1 may be used as a buck regulator. For example, a buck voltage regulator may be used in power delivery applications in which an input voltage is to be transformed to an output voltage in a ratio that is smaller than one. On the other hand, a boost voltage regulator may be used in power delivery applications in which an input voltage is to be transformed to an output voltage in a ratio that is larger than one. Also, a buck-boost voltage regulator may refer to the combination of the two types of VR, e.g., used in power delivery applications in which an input voltage is to be transformed to an output voltage in a ratio that may be smaller and/or larger than one.

Although various embodiments of this disclosure are discussed with respect to a buck regulator, such as the VR 100, the principles of this disclosure may also be applied to a boost voltage regulator, a buck-boost voltage regulator, or another appropriate type of VR.

In some embodiments, buck regulators, such as the VR 100, may operate using Pulse Frequency Modulation (PFM) control, hysteretic control, Pulse Width Modulation (PWM) control, and/or the like. For example, at light load, a buck regulator may operate using PFM control and/or hysteretic control. Operating using PFM control and/or hysteretic control may enable the switching frequency of the switches to reduce with the load, which may result in increased efficiency. However, in some examples (e.g., where the random number generation circuitry 124 is non-operational in the VR 100 and no randomness is injected in the operation of the VR 100), operation using PFM control and/or hysteretic control may cause the switching frequency to vary with the load, and hence, an emitted EMI and/or RFI may be of unpredictable frequencies. Such unpredictable EMI and/or RFI may cause interference with electrical components in the vicinity (e.g., may cause interference with other components of an apparatus that includes the VR 100).

In some embodiments and as will be discussed in further details herein, the operational of the VR 100 may be at least in part randomized, e.g., based on one or more random (or pseudo-random) numbers generated by the circuitry 120. For example, one or more threshold voltage levels, one or more threshold current levels, one or more on-time, etc., used for controlling the VR 100 may be at least in part randomized. Such randomization may result in random variation in the switching frequencies of the VR 100. This may spread the EMI and/or the RFI across a broad range of frequencies.

In an example, without such randomization, the EMI and/or the RFI could have been restricted to a narrow band of frequencies, or to a specific frequency, which would have exacerbated the EMI and/or the RFI at such frequency or frequencies. However, due to the randomization of one or more parameters of the VR 100, there is a random variation in the switching frequencies of the VR 100, which may spread the EMI and/or the RFI across a broad range of frequencies. This may reduce the EMI and/or the RFI at any specific frequency, thereby reducing the adverse effects of the EMI and/or the RFI.

Figure 2:
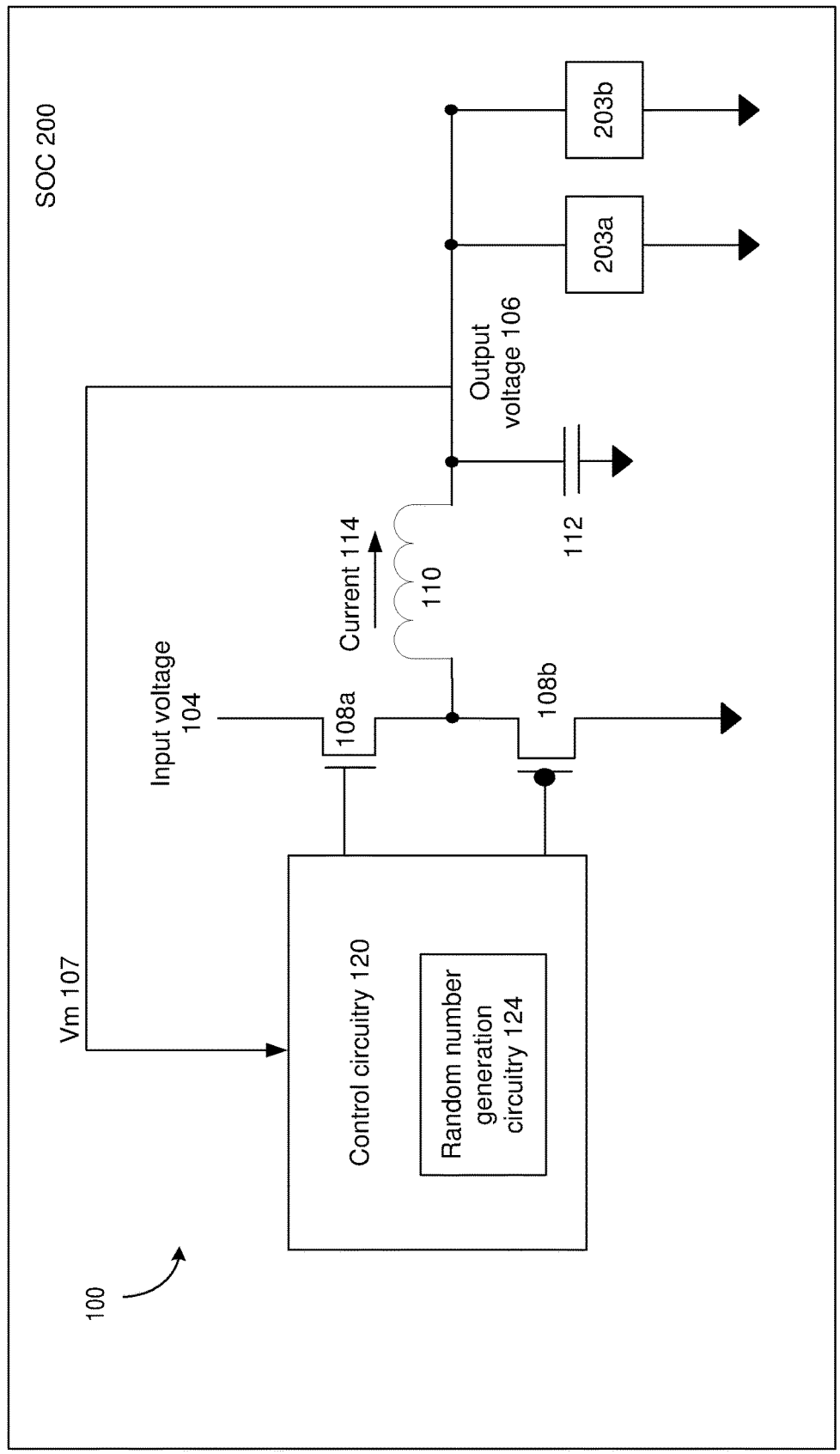
FIG. 2 illustrates a system-on-a-chip (SOC) comprising the VR of FIG. 1, and one or more components receiving an output voltage from the VR, according to some embodiments.

FIG. 2 illustrates a system-on-a-chip (SOC) 200 comprising the VR 100 of FIG. 1 and one or more components 203a, 203b receiving the output voltage 106 from the VR 100, according to some embodiments. Thus, the components 203a, 203b are the load of the VR 100. Although merely two components 203a and 203b are illustrated to be receiving the output voltage 106, in an example, any different number of components may receive the output voltage 106. The components 203a, 203b may be any appropriate component of a SOC, e.g., one or more processing cores of a Central Processing Unit (CPU), one or more cores of a Graphics Processing Unit (GPU), a cache, a phase locked loop (PLL), a clock generation component, a network interface, a communication interface, an Input/Output (I/O) interface, a memory controller, and/or any component that is to receive an output voltage from a VR.

Thus, in the example of FIG. 2, the VR 100 is an on-chip VR. The VR 100 and the load components 203a, 203b may be integrated in a same integrated circuit chip.

Although FIG. 2 illustrates the VR 100 to be an on-chip VR (e.g., where the VR 100 is integrated with the load components 203a, 203b in a same chip), in some other examples the VR 100 may be an on-board VR as well. In such examples, the VR 100 may be formed on a circuit board (e.g., printed circuit board or PCB), and the load components 203a, 203b may be on the circuit board, within a chip that is on the circuit board, and/or within a chip that is coupled to the circuit board.

Referring again to FIG. 1, the VR 100 may, in some examples, operate in accordance with PFM. PFM is a modulation method for representing an analog signal using two levels (e.g., 1 and 0). In PWM, the magnitude of an analog signal is encoded in the duty cycle of a square wave. However, unlike PWM (e.g., in which the width of square pulses is varied at constant frequency), PFM generally fixes the width of square pulses, while varying the frequency. In other words, the frequency of the pulse train is varied in accordance with the instantaneous amplitude of the modulating signal at sampling intervals. Generally, in PFM, the amplitude and width of the pulses are kept constant.

In some embodiments, in the context of the VR 100, the PFM may be applied such that the width of the pulses may be varied randomly, e.g., in addition to varying the frequency of the pulses. For example, for PFM, in case the output voltage 106 is below a lower threshold point (LTP) voltage $V_{LTP}$, the switch 108a may be turned on, causing the inductor current 114 and the output voltage 106 to rise. The switch 108a may be turned off based on satisfaction of a condition. For example, the switch 108a may be turned off based on the inductor current 114 reaching a peak current $I_{peak}$, or a after a fixed duration of ON-time TON (as will be discussed herein, the peak current $I_{peak}$ and/or the ON-time TON may be randomly varied). Once the switch 108a is turned off, the inductor current 114 and later the output voltage 106 may fall, until the output voltage 106 become less than $V_{LTP}$, and the cycle repeats. The current ripple in the inductor current 114 may be maintained to be about constant, and the switching frequency may be dependent on the load current.

Figure 3:
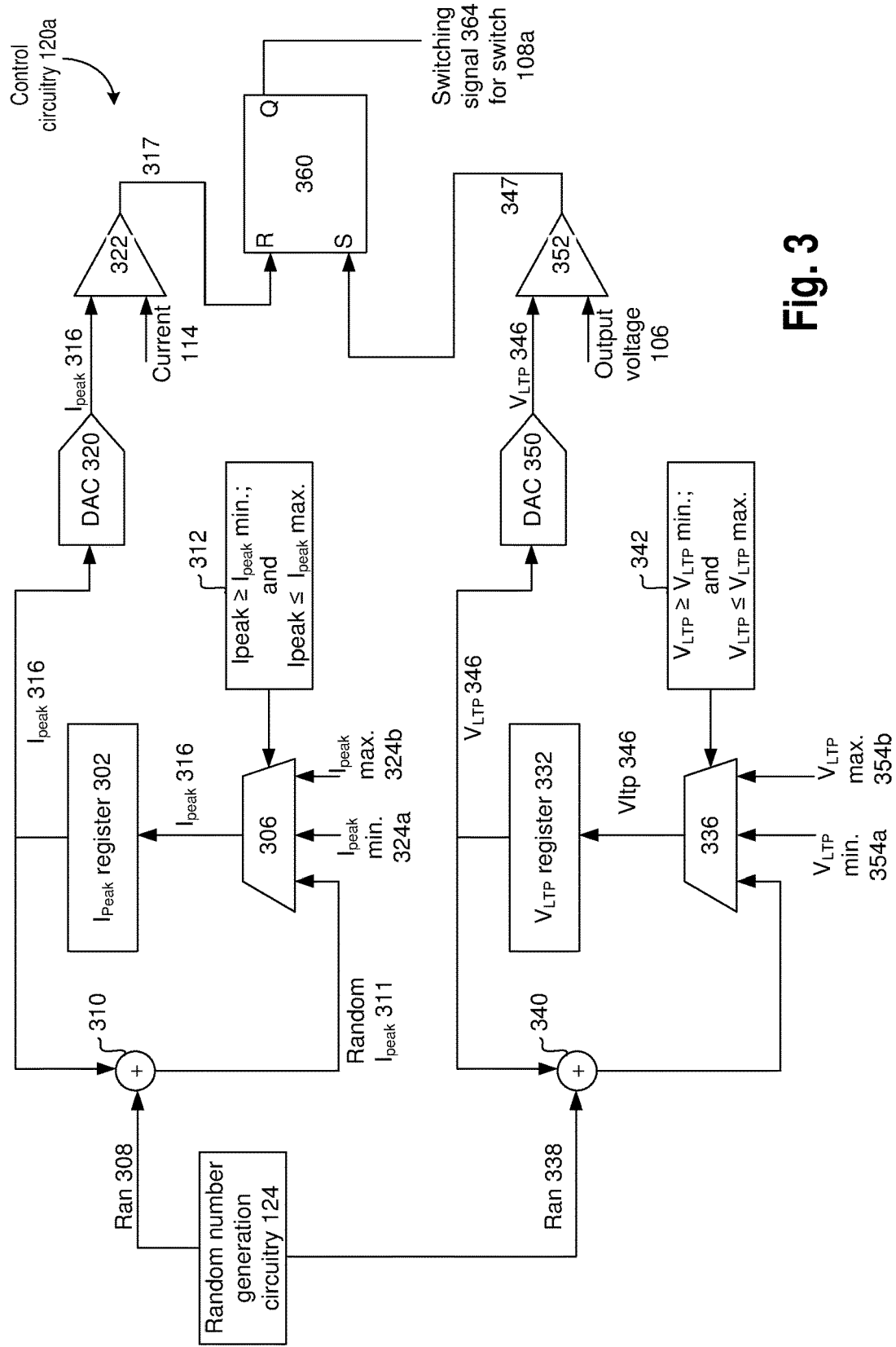
FIG. 3 illustrates an example implementation of a control circuitry of a VR, with Pulse Frequency Modulation (PFM) control for the VR and with an inductor current being used as feedback to turn off a switch of the VR, according to some embodiments.

FIG. 3 illustrates an example implementation of the circuitry 120, with PFM control for the VR 100 of FIG. 1 and with inductor current 114 being used as feedback to turn off the switch 108a of the VR 100, according to some embodiments. The example implementation of the circuitry 120 of FIG. 3 is referred to as circuitry 120a.

In the example circuitry 120a, in case the output voltage 106 is at or below a randomized lower threshold voltage $V_{LTP}$ 346, the switch 108a may be turned on, causing the inductor current 114 and the output voltage 106 to rise. The switch 108a may be turned off based on the inductor current 114 reaching or exceeding a randomized peak current $I_{peak}$ 316. In some embodiments, the circuitry 120 of FIG. 3 employs PFM modulation to control the switches 108a and 108b. FIG. 3 illustrates generation of a switching signal 364 to control the switch 108a.

In one example, another switching signal may be generated for switching the switch 108b, e.g., in at least in part similar but complementary manner. In another example, the same switching signal 364 may be used for switching the switch 108b, assuming that the switches 108a and 108b are complimentary transistors.

As discussed with respect to the FIG. 1, the circuitry 120a comprises the random number generation circuitry 124. In some embodiments, the circuitry 120a generates two sequences of random or pseudo-random numbers, e.g., Ran 308 and Ran 338. In an example, Ran 308 and Ran 338 are the same sequence of random or pseudo-random numbers. In another example, Ran 308 and Ran 338 are two different sequences of random or pseudo-random numbers.

In some embodiments, the sequences of random or pseudo-random numbers Ran 308 and Ran 338 may comprise positive and negative random numbers. In some other embodiments, the sequences of random or pseudo-random numbers Ran 308 and Ran 338 may comprise merely positive random numbers (and not negative random numbers).

In some embodiments, the circuitry 124 may be a Linear Feedback Shift Register (LFSR), e.g., an 8 bit or 16 bit LFSR, to generate the random or pseudo-random numbers Ran 308 and Ran 338. In some other embodiments, the Ran 308 and Ran 338 may be generated using another appropriate manner, such as using thermal noise or metastable flop to generate the random numbers.

In some other embodiments, the circuitry 124 may utilize an output of an Analog-to-Digital converter (ADC) to generate the random number sequences Ran 308 and Ran 338. For example, the ADC (not illustrated in FIG. 3) may measure the output voltage 106 and may be used to implement a comparator 350 (discussed herein later) digitally (e.g., in such examples, a DAC 352 may be redundant). If the ADC has more resolution than used, and the Least Significant Bits (LSB) of the ADC may change multiple times during a normal switching cycle, and the LSBs of the sensed output voltage may be used to generate the random number sequences Ran 308 and/or Ran 338. For example, the continuously changing LSBs can be used as a seed or trigger to generate the random numbers.

In some embodiments, the circuitry 120 may comprise a $I_{peak}$ register 302 to store the generated $I_{peak}$ value to be used to control the switch 108a. A summation block 310 may sum the $I_{peak}$ value from the register 302 with a random number from the sequence Ran 308. In an example, the output of summation block 310 may be a random peak current $I_{peak}$ 311.

For example, a randomly generated $I_{peak}$ 316 during a first switching cycle may be stored in the register 302, and may be used (e.g., via the summation block 310) to generate the random $I_{peak}$ 311 for a second switching cycle that occurs immediately after the first switching cycle. Thus, the random $I_{peak}$ 311 for a given cycle is based on the $I_{peak}$ 316 of the previous cycle and a random number from the sequence Ran 308.

In some embodiments, the Ran 308 may be limited to a certain percentage (e.g., about 10%) of a nominal value of the $I_{peak}$. Also, the Ran 308 may comprise both positive and negative random numbers. Thus, generally, the random $I_{peak}$ 311 may be within ±10%, ±20%, or the like, of a nominal $I_{peak}$.

A multiplexer 306 may receive the random $I_{peak}$ 311, and may also receive an $I_{peak}$ minimum (min) 324a and an $I_{peak}$ maximum (max) 324b. The $I_{peak}$ min 324a may represent a minimum permissible value of $I_{peak}$, and $I_{peak}$ max 324b may represent a maximum permissible value of $I_{peak}$.

For example, the multiplexer 306 may be controlled by a condition logic 312 (also referred to as condition 312), which restricts a generated $I_{peak}$ 316 to be within a range between $I_{peak}$ min 324a and $I_{peak}$ max 324b. Thus, if the random $I_{peak}$ 311 is less than $I_{peak}$ min 324a, the multiplexer 306 may output $I_{peak}$ min 324a. If the random $I_{peak}$ 311 is more than $I_{peak}$ max 324b, the multiplexer 306 may output $I_{peak}$ max 324b. If the random $I_{peak}$ 311 is between $I_{peak}$ max 324b and $I_{peak}$ min 324a, the multiplexer 306 may output the random $I_{peak}$ 311. The output of the multiplexer 306 is labelled as $I_{peak}$ 316.

The register 302 may temporarily store the $I_{peak}$ 316, and output the $I_{peak}$ 316 to a Digital to Analog Converter (DAC) 320 (e.g., assuming that the comparator 322 is implemented in analog domain). An output of the DAC 320 may be an analog version of the $I_{peak}$ 316. The comparator 322 may compare the $I_{peak}$ 316 to a feedback of the inductor current 114, and generate a comparison signal 317.

Thus, a first section of the circuitry 120a comprising the circuitry 124, the multiplexer 306, the register 302, the condition 312, the DAC 320, and the comparator 322 may generate the comparison signal 317, based on comparing the feedback of the current 114 to a randomized peak current $I_{peak}$ 316.

A second section of the circuitry 120a may comprise the circuitry 124, a multiplexer 336, a register 332, a condition 342, a DAC 350, and a comparator 352. The second section of the circuitry 120a may generate a randomized low threshold point voltage $V_{LTP}$ 346 (e.g., similar to the generation of the randomized $I_{peak}$ 316). The comparator 352 may compare the randomized $V_{LTP}$ 346 with the output voltage 106, to generate a comparison signal 347.

In some embodiments, a flip-flop 360 may receive the comparison signals 317 and 347, and generate the switching signal 364 for the switch 108a. For example, the switch 108a may be on if the switching signal 364 is high, and the switch 108a may be off if the switching signal 364 is low.

If the switches 108a and 108b are implemented as complimentary transistors, the same switching signal 364 may be used to control the switch 108b. In some embodiments, the switch 108b may operate in a complimentary manner relative to the operation of the switch 108a.

Figure 4:
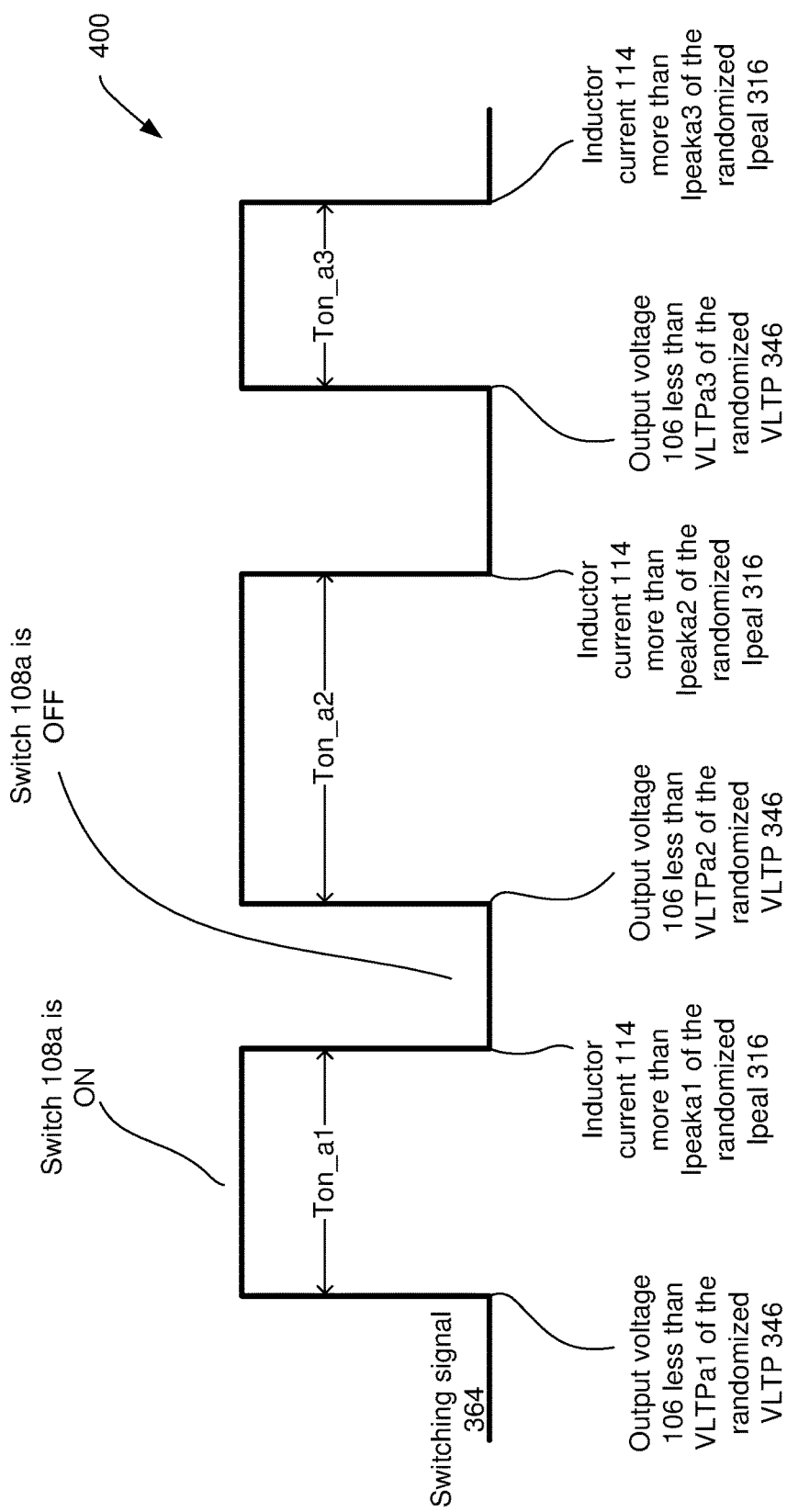
FIG. 4 illustrates a timing diagram of a switching signal of the control circuitry of FIG. 3, according to some embodiments.

FIG. 4 illustrates a timing diagram 400 of the switching signal 364 for the circuitry 120a of FIG. 3, according to some embodiments. For example, in the circuitry 120a of FIG. 3, in case the output voltage 106 is below the randomized lower threshold voltage $V_{LTP}$ 346, the switch 108a may be turned on. The switch 108a may be turned off based on the inductor current 114 reaching the randomized peak current $I_{peak}$ 316.

Referring now to FIGS. 3 and 4, assume that during a first cycle of operation, the random values of $I_{peak}$ 316 and $V_{LTP}$ 346 are $I_{peak}$ a1 and $V_{LTP}$a1, respectively. Accordingly, in the timing diagram 400, during the first cycle, the switch 108a is switched on based on the output voltage 106 being less than (or equal to) $V_{LTP}$a1, and the switch 108a is switched off based on the inductor current 114 being more than (or equal to) $I_{peak}$ a1. During the first cycle, assume that the switch 108a is on for a time period Ton_a1.

Assume that during a second cycle of operation, the random values of $I_{peak}$ 316 and $V_{LTP}$ 346 are $I_{peak}$ a2 and $V_{LTP}$a2, respectively. Accordingly, in the timing diagram 400, during the second cycle, the switch 108a is switched on based on the output voltage 106 being less than (or equal to) $V_{LTP}$a2, and the switch 108a is switched off based on the inductor current 114 being more than (or equal to) $I_{peak}$ a2. During the second cycle, assume that the switch 108a is on for a time period Ton_a2.

Assume that during a third cycle of operation, the random values of $I_{peak}$ 316 and $V_{LTP}$ 346 are $I_{peak}$ a3 and $V_{LTP}$a3, respectively. Accordingly, in the timing diagram 400, during the third cycle, the switch 108a is switched on based on the output voltage 106 being less than (or equal to) $V_{LTP}$a3, and the switch 108a is switched off based on the inductor current 114 being less than (or equal to) $I_{peak}$ a3. During the third cycle, assume that the switch 108a is on for a time period Ton_a3.

Thus, as the switching of the switch 108 is based on the randomized lower threshold voltage $V_{LTP}$ 346 and the randomized peak current $I_{peak}$ 316, the time periods Ton_a1, Ton_a2 and Ton_a3 may be random and different from each other. Thus, the switching frequency of the VR 100 may be at least in part randomized. This may spread the EMI and the RFI across a broad range of frequencies. This may, in turn, reduce the EMI and/or the RFI at any specific frequency, thereby reducing the adverse effects of the EMI and/or the RFI.

Although FIGS. 3 and 4 assume random variation of both the peak current $I_{peak}$ and the lower threshold voltage $V_{LTP}$, in an example, merely one (but not both) of the peak current $I_{peak}$ and the lower threshold voltage $V_{LTP}$ may be randomized. Such a randomization of one of the two thresholds may also result in some random variation of the switching frequency.

In some embodiments, the randomized lower threshold voltage $V_{LTP}$ 346 may be bound by a $V_{LTP}$ min 354a (e.g., input to the multiplexer 336). In some embodiments, the $V_{LTP}$ min 354a may be a minimum voltage specification for the load 203. Thus, the output voltage 106 may be always at or higher than the $V_{LTP}$ min 354a, thereby ensuring that the VR 100 meets the minimum voltage specification requirements. The randomization of the lower threshold voltage $V_{LTP}$ 346 may randomly increase the lower threshold voltage $V_{LTP}$ 346, without impacting the minimum voltage requirement of the VR 100.

In some embodiments, a limit may be imposed on a random variation of the lower threshold voltage $V_{LTP}$ 346. Merely as an example, the random variation may be restricted to 10% of $V_{LTP}$ min 354a. Thus, for example, if $V_{LTP}$ min 354a is 3 Volts, then $V_{LTP}$ max 354b may be 3.3 V. For such an example, the random numbers in the sequence Ran 338 may be bounded by +0.15 V and −0.15 V (e.g., within ±0.15 V). In another example, the random numbers in Ran 338 may be bounded by 0 V and +0.3 V.

In some embodiments, the randomized peak current $I_{peak}$ 316 may be bound by a $I_{peak}$ max 324b (e.g., input to the multiplexer 306). In some embodiments, the $I_{peak}$ max 324b may be a maximum permissible inductor peak current 114 specified for the load 203. Thus, the inductor current 114 may be always at or lower than the $I_{peak}$ max 324b, thereby ensuring that the VR 100 meets the maximum current specification requirements. The randomization of the peak current $I_{peak}$ 316 may randomly decrease the $I_{peak}$ max 324b, without impacting the current specification.

In some embodiments, a limit may be imposed on a random variation of the peak current $I_{peak}$ 316. Merely as an example, the random variation may be restricted to 10% of $I_{peak}$ max 324b. Thus, for example, if $I_{peak}$ max 324b is 1 Amperes, then $I_{peak}$ min 324a may be 0.9 A. For such an example, the random numbers in Ran 308 may be bounded by +0.05 A and −0.05 A (e.g., within ±0.1 A). In another example, the random numbers in Ran 308 may be bounded by 0 V and +0.1 A.

In FIG. 3, the switching off of the switch 108a is based on comparing the inductor current 114 with the randomized $I_{peak}$ 316. In some other embodiments, the switch 108a may be switched off after being switched on for a randomized ON-time period TON. For example, FIG. 5 illustrates an example implementation of the circuitry 120, with PFM control for the VR 100 of FIG. 1 and with an ON-time period (TON) being used to turn off the switch 108a of the VR 100, according to some embodiments.

Figure 5:
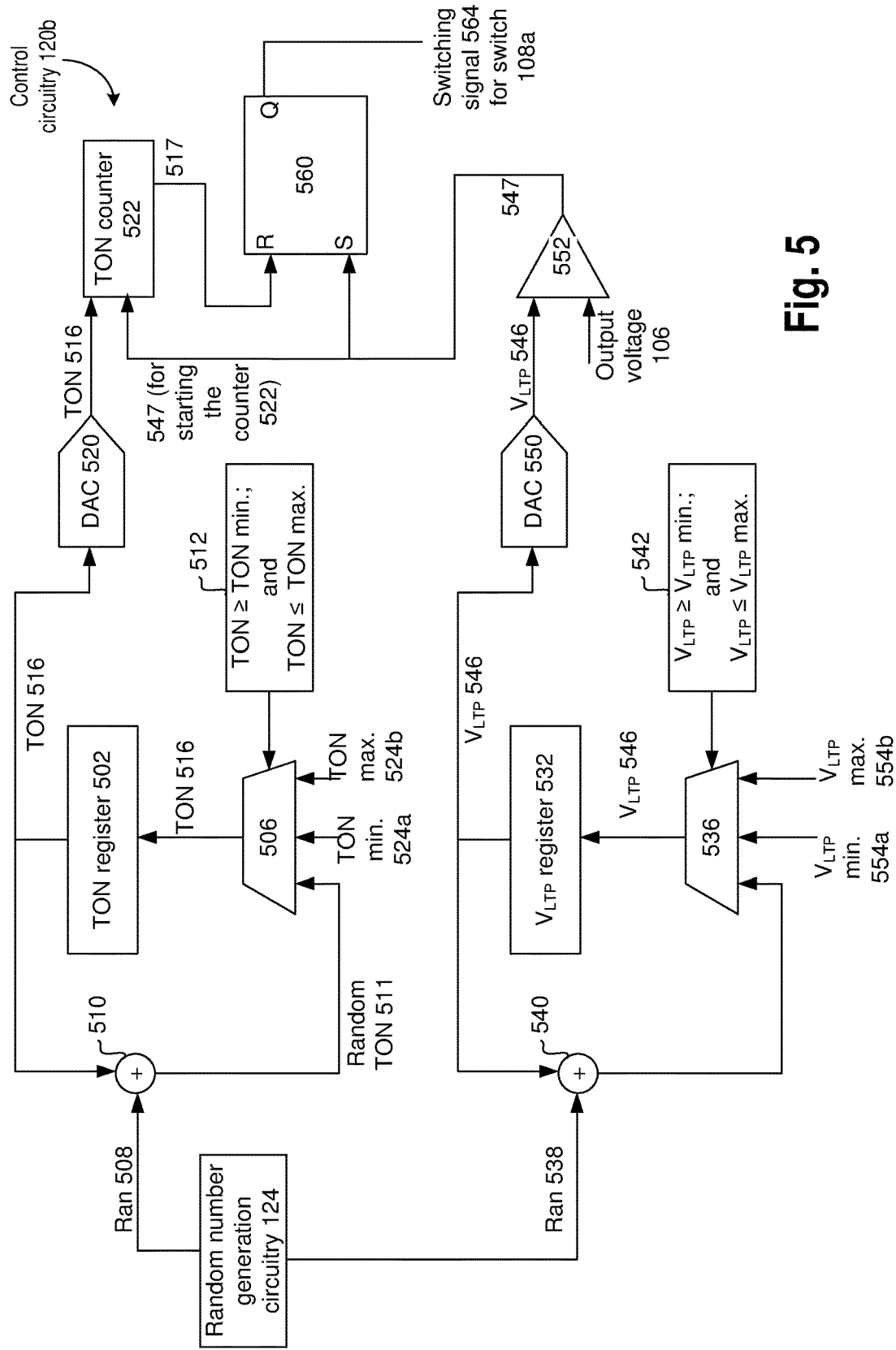
FIG. 5 illustrates an example implementation of a control circuitry of a VR, with PFM control for the VR and with an ON-time period (TON) being used to turn off a switch of the VR, according to some embodiments.

The example implementation of the circuitry 120 of FIG. 5 is referred to as circuitry 120b. Thus, in the example circuitry 120a, in case the output voltage 106 is at or below a randomized lower threshold voltage $V_{LTP}$ 546, the switch 108a may be turned on, causing the inductor current 114 and the output voltage 106 to rise. The switch 108a may be turned off after a randomized ON-time period TON. In some embodiments, the circuitry 120b of FIG. 5 employs PFM modulation to control the switches 108a and 108b. FIG. 5 illustrates generation of a switching signal 564 to control the switch 108a. Another switching signal may be generated for switching the switch 108b, e.g., in at least in part similar but complementary manner. (or the same switching signal may be used to control the switch 108b, as discussed with respect to FIG. 3).

FIG. 5 is at least in part similar to FIG. 3. For example, the circuitry 120b of FIG. 5 comprises the register 532, the multiplexer 536, the condition 542, the summation block 540, the circuitry 124, the DAC 550, and the comparator 552 to generate the comparison signal 547, which may be similar to the corresponding components to generate the comparison signal 347 in FIG. 3.

Also, the components 124, 310, 302, 306, 312 and 320 of FIG. 3 were used to generate the $I_{peak}$ 316. Similarly, in FIG. 5, circuitry 124, summation block 510, multiplexer 506, condition 512, and the DAC 520 are used to generate a randomized ON-time TON 516.

In some embodiments, the randomized ON-time TON 516 may be received by a counter 522. The counter 522 starts counting when the comparison signal 547 toggles to high (e.g., when the switch 108a is switched on). The counter 522 stops once it reaches the random ON-time TON 516, after which the switching signal 564 is turned to low (e.g., the switch 108a is off).

Figure 6:
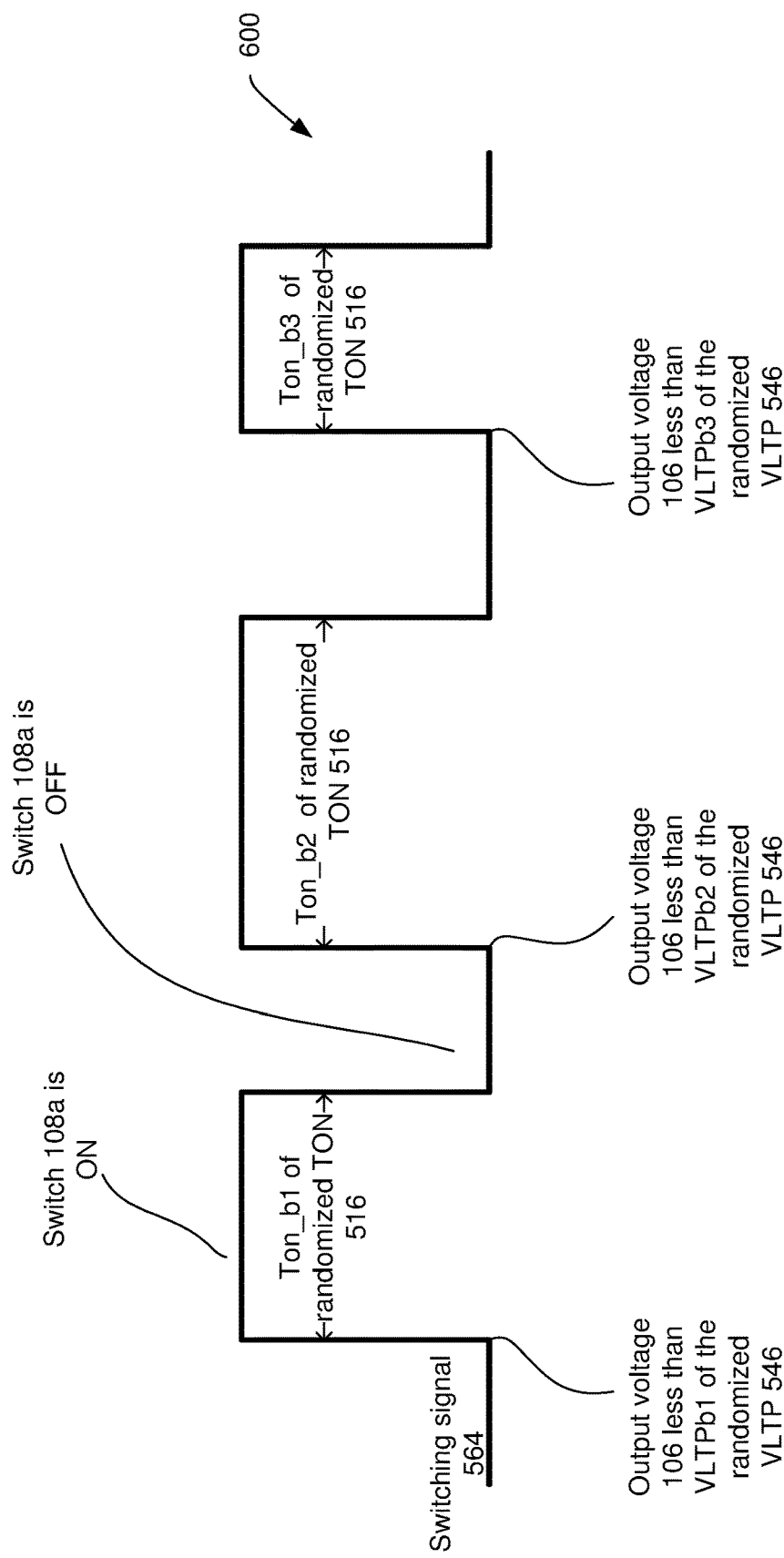
FIG. 6 illustrates a timing diagram of a switching signal for the control circuitry of FIG. 5, according to some embodiments.

FIG. 6 illustrates a timing diagram 600 of the switching signal 564 for the circuitry 120b of FIG. 5, according to some embodiments. For example, in the circuitry 120b of FIG. 5, in case the output voltage 106 is below the randomized lower threshold voltage $V_{LTP}$ 546, the switch 108a may be turned on. The switch 108a may be turned off after the randomized ON-time TON 516.

Referring now to FIGS. 5 and 6, assume that during a first cycle of operation, the random values of ON-time TON 516 and $V_{LTP}$ 546 are Ton_b1 and $V_{LTP}$b1, respectively. Accordingly, in the timing diagram 600, during the first cycle, the switch 108a is switched on based on the output voltage 106 being less than (or equal to) $V_{LTP}$b1, and the switch 108a is switched off after the random time period Ton_b1.

Assume that during a second cycle of operation, the random values of ON-time TON 516 and $V_{LTP}$ 546 are Ton_b2 and $V_{LTP}$b2, respectively. Accordingly, in the timing diagram 600, during the second cycle, the switch 108a is switched on based on the output voltage 106 being less than (or equal to) $V_{LTP}$b2, and the switch 108a is switched off after the random time period Ton_b2.

Assume that during a third cycle of operation, the random values of ON-time TON 516 and $V_{LTP}$ 546 are Ton_b3 and $V_{LTP}$b3, respectively. Accordingly, in the timing diagram 600, during the third cycle, the switch 108a is switched on based on the output voltage 106 being less than (or equal to) $V_{LTP}$b3, and the switch 108a is switched off after the random time period Ton_b3.

Thus, as the switching of the switch 108 is based on the randomized lower threshold voltage $V_{LTP}$ 346 and the randomized ON-time TON 516, the time periods Ton_b1, Ton_b2 and Ton_b3 may be random and different from each other. Thus, the switching frequency of the VR 100 may be at least in part randomized. This may spread the EMI and the RFI across a broad range of frequencies. This may, in turn, reduce the EMI and/or the RFI at any specific frequency, thereby reducing the adverse effects of the EMI and/or the RFI.

Although FIGS. 5 and 6 assume random variation of both the lower threshold voltage $V_{LTP}$ and the ON-time TON, in an example, merely one (but not both) of the lower threshold voltage $V_{LTP}$ and the ON-time TON may be randomized. Such a randomization of one of the two thresholds may also result in some random variation of the switching frequency.

Similar to the circuitry 120a, in the circuitry 120b, the randomized lower threshold voltage $V_{LTP}$ 546 may be bound by a $V_{LTP}$ min 554a (e.g., input to the multiplexer 336). In some embodiments, the $V_{LTP}$ min 554a may be a minimum voltage specification for the load 203. Thus, the output voltage 106 may be always at or higher than the $V_{LTP}$ min 554a, thereby ensuring that the VR 100 meets the minimum voltage specification requirements. The randomization of the lower threshold voltage $V_{LTP}$ 546 may randomly increase the lower threshold voltage $V_{LTP}$ 546, without impacting the minimum voltage requirement of the VR 100.

Similarly, in the circuitry 120b, the randomized ON-time TON 516 may be bound by a TON min 524a (e.g., input to the multiplexer 506). In some embodiments, the TON min 524a may be a minimum ON time specified for the load 203. Thus, the switch 108a may be switched on for at least a specified time period TOM min 524a.

Figure 7:
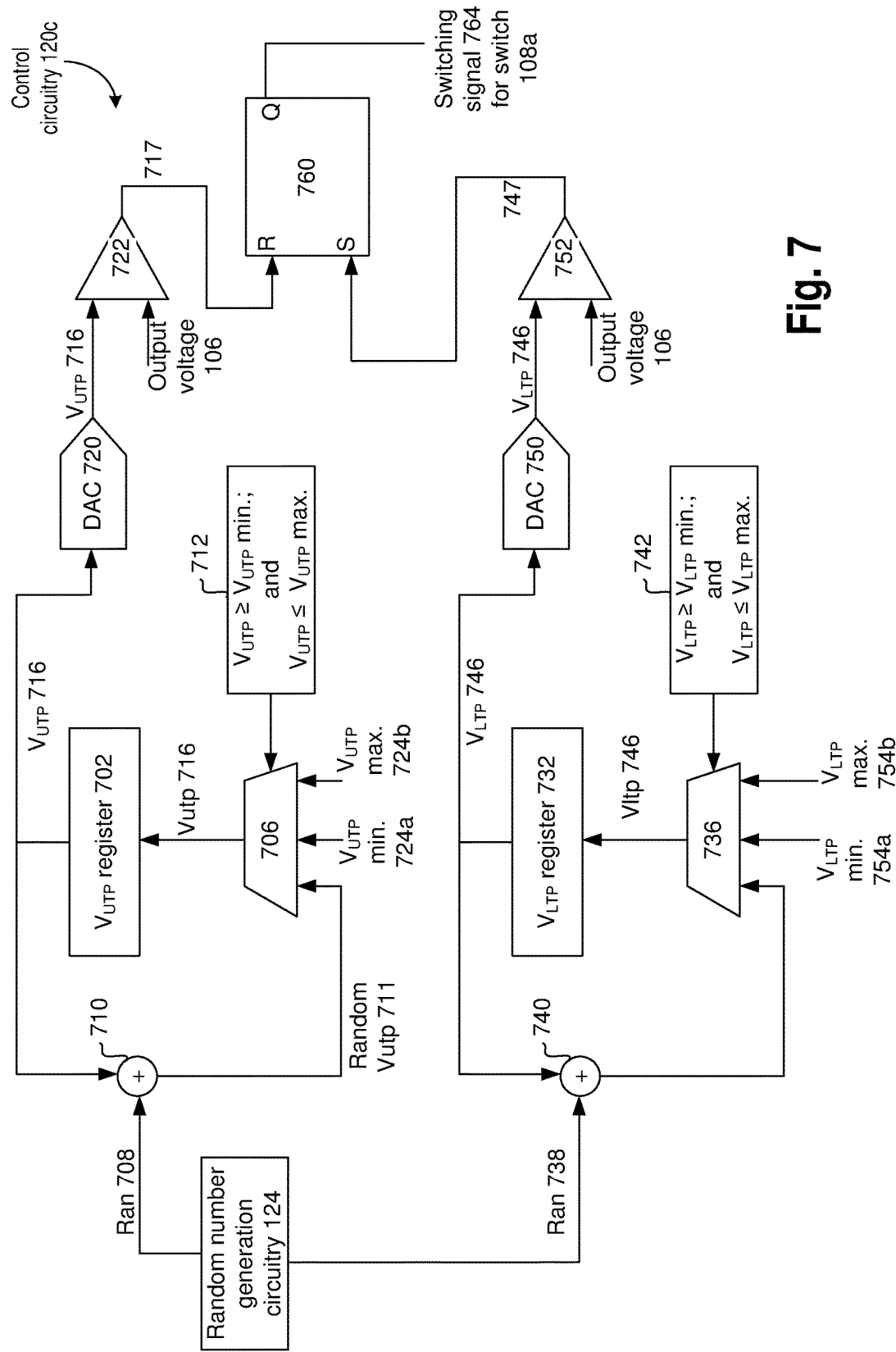
FIG. 7 illustrates an example implementation of a control circuitry of a VR, with hysteretic control for the VR and with an output voltage being used as feedback to turn on and turn off a switch of the VR, according to some embodiments.

FIG. 7 illustrates an example implementation of the circuitry 120, with hysteretic control for the VR 100 of FIG. 1 and with output voltage 106 being used as feedback to turn on and turn off the switch 108a of the VR 100, according to some embodiments. The example implementation of the circuitry 120 of FIG. 7 is referred to as circuitry 120c.

The circuitry 120c of FIG. 7 employs hysteretic control to regulate the VR 100. In hysteretic control, the output voltage 106 is maintained between upper and lower threshold points $V_{UTP}$ and $V_{LTP}$, respectively. If the output voltage 106 reaches or falls below the lower threshold point $V_{LTP}$, the switch 108b is turned off and the switch 108a is turned on, causing the output voltage 106 to rise. When the output voltage 106 reaches or is above the upper threshold point $V_{UTP}$, the switch 108a is turned off and the switch 108b is turned on, causing the inductor current 114 and later the output voltage 106 to fall, and this the cycle repeats when the output voltage 106 reaches the $V_{LTP}$. Thus, the output voltage 106 is maintained between $V_{LTP}$ and $V_{HTP}$. The switching frequency may increase with increase in the load current. In the embodiments of FIG. 7, the upper and lower threshold points are randomized $V_{UTP}$ 716 and randomized $V_{LTP}$ 746, respectively.

FIG. 7 is at least in part similar to FIG. 3. For example, the circuitry 120c of FIG. 7 comprises the register 732, the multiplexer 736, the condition 742, the summation block 740, the circuitry 124, the DAC 750, and the comparator 752 to generate the comparison signal 747, which may be similar to the corresponding components to generate the comparison signal 347 in FIG. 3. For example, the comparator 752 compares a randomized $V_{LTP}$ 746 and the output voltage 106, and generates the comparison signal 747.

Similarly, register 702, multiplexer 705, condition 712, summation block 710, the circuitry 124, DAC 720, and comparator 722 are to generate a comparison signal 717. For example, the comparator 722 compares a randomized $V_{UTP}$ 716 and the output voltage 106, and generates the comparison signal 717. Generation of the randomized $V_{UTP}$ 716 will be evident from the generation of the randomized $V_{LTP}$ 746, and hence, generation of the randomized $V_{UTP}$ 716 will not be discussed in further details herein. The flip-flop 760 may receive the comparison signals 717 and 747, and generate the switching signal 746 that controls the switch 108a.

Figure 8:
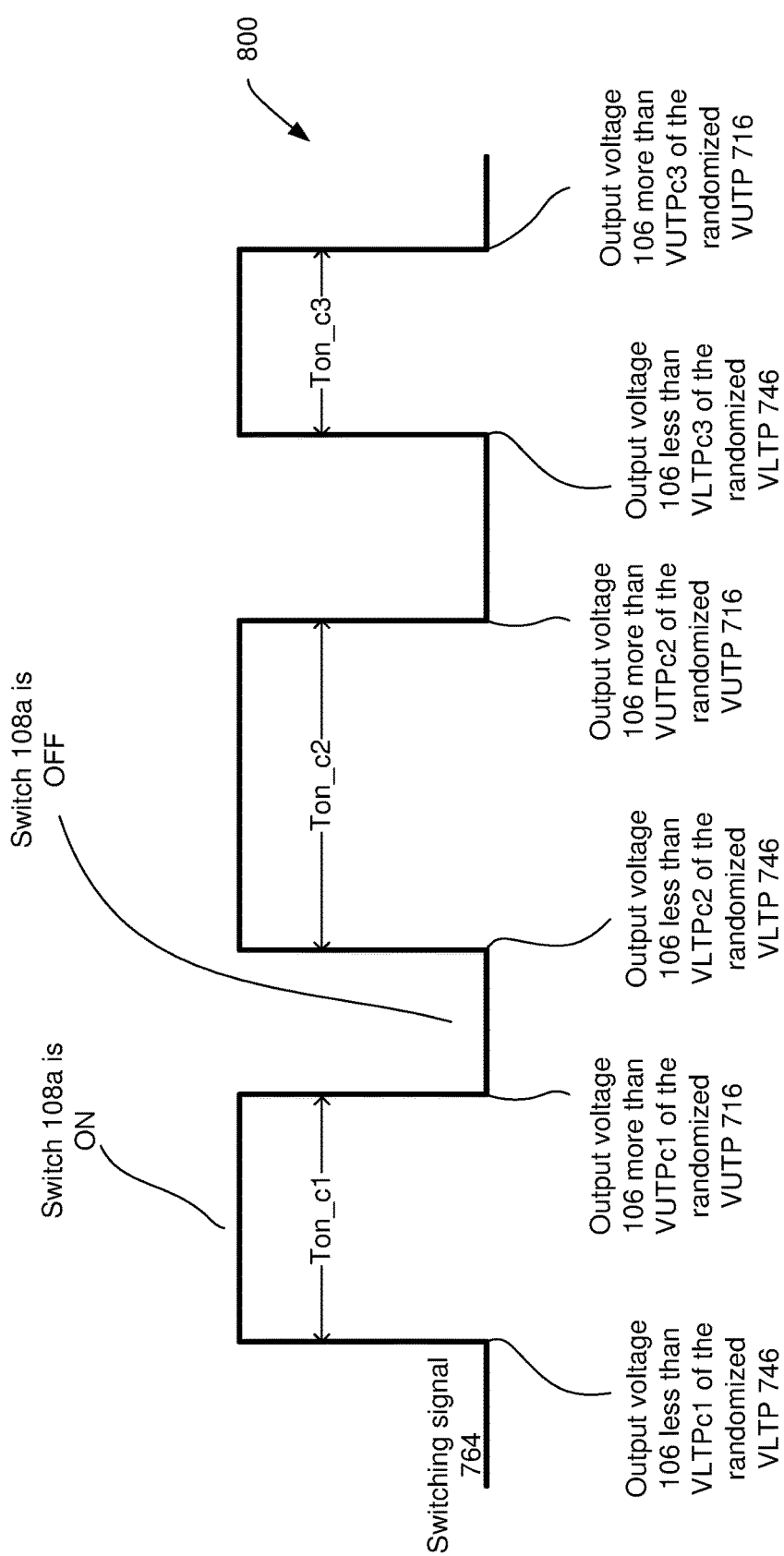
FIG. 8 illustrates a timing diagram of a switching signal for the control circuitry of FIG. 7, according to some embodiments.

FIG. 8 illustrates a timing diagram 800 of the switching signal 764 for the circuitry 120c of FIG. 7, according to some embodiments. For example, in the circuitry 120c of FIG. 7, in case the output voltage 106 reaches or falls below the randomized lower threshold voltage $V_{LTP}$ 746, the switch 108a may be turned on. The switch 108a may be turned off if the output voltage 106 reaches or goes above the randomized upper threshold voltage $V_{UTP}$ 716.

Referring now to FIGS. 7 and 8, assume that during a first cycle of operation, the random values of $V_{LTP}$ 746 and $V_{UTP}$ 716 are $V_{LTP}$c1 and $V_{UTP}$c1, respectively. Accordingly, in the timing diagram 800, during the first cycle, the switch 108a is switched on based on the output voltage 106 being less than or equal to $V_{LTP}$c1, and the switch 108a is switched off based on the output voltage 106 being higher than or equal to $V_{UTP}$c1. During the first cycle, assume that the switch 108a is on for a time period Ton_c1.

Similarly, assume that during a second cycle of operation, the random values of $V_{LTP}$ 746 and $V_{UTP}$ 716 are $V_{LTP}$c2 and $V_{UTP}$c2, respectively. Accordingly, in the timing diagram 800, during the second cycle, the switch 108a is switched on based on the output voltage 106 being less than or equal to $V_{LTP}$c2, and the switch 108a is switched off based on the output voltage 106 being higher than or equal to $V_{UTP}$c2. During the second cycle, assume that the switch 108a is on for a time period Ton_c2.

Similarly, assume that during a third cycle of operation, the random values of $V_{LTP}$ 746 and $V_{UTP}$ 716 are $V_{LTP}$c3 and $V_{UTP}$c3, respectively. Accordingly, in the timing diagram 800, during the third cycle, the switch 108a is switched on based on the output voltage 106 being less than or equal to $V_{LTP}$c3, and the switch 108a is switched off based on the output voltage 106 being higher than or equal to $V_{UTP}$c3. During the third cycle, assume that the switch 108a is on for a time period Ton_c3.

Thus, as the switching of the switch 108 is based on the randomized lower threshold voltage $V_{LTP}$ 746 and the randomized upper threshold voltage $V_{UTP}$ 716, the time periods Ton_c1, Ton_c2 and Ton_c3 may be random and different from each other. Thus, the switching frequency of the VR 100 may be at least in part randomized. This may spread the EMI and the RFI across a broad range of frequencies. This may, in turn, reduce the EMI and/or the RFI at any specific frequency, thereby reducing the adverse effects of the EMI and/or the RFI.

Similar to the circuitry 120a, in the circuitry 120c, the randomized lower threshold voltage $V_{LTP}$ 746 may be bound by a $V_{LTP}$ min 754a (e.g., input to the multiplexer 736). In some embodiments, the $V_{LTP}$ min 754a may be a minimum voltage specification for the load 203. Thus, the output voltage 106 may be always at or higher than the $V_{LTP}$ min 754a, thereby ensuring that the VR 100 meets the minimum voltage specification requirements. The randomization of the lower threshold voltage $V_{LTP}$ 746 may randomly increase the lower threshold voltage $V_{LTP}$ 746, without impacting the minimum voltage requirement of the VR 100. Ranges of the sequence of random values Ran 738 may be similar to that discussed with respect to FIG. 4.

In some embodiments, in the circuitry 120c, the randomized upper threshold point voltage $V_{UTP}$ 716 may be bound by a $V_{UTP}$ max 724b (e.g., input to the multiplexer 706). In some embodiments, the $V_{UTP}$ max 724b may be a maximum voltage specification for the load 203. Thus, the output voltage 106 may be always at or lower than the $V_{UTP}$ max 724b, thereby ensuring that the VR 100 meets the maximum voltage specification requirements. The randomization of the upper threshold point voltage $V_{UTP}$ 716 may randomly decrease the upper threshold voltage $V_{UTP}$ 716, without impacting the maximum voltage requirement of the VR 100. Ranges of the sequence of random values Ran 708 may be evident to those skilled in the art, based on the discussion about the ranges with respect to FIG. 4.

Figure 9:
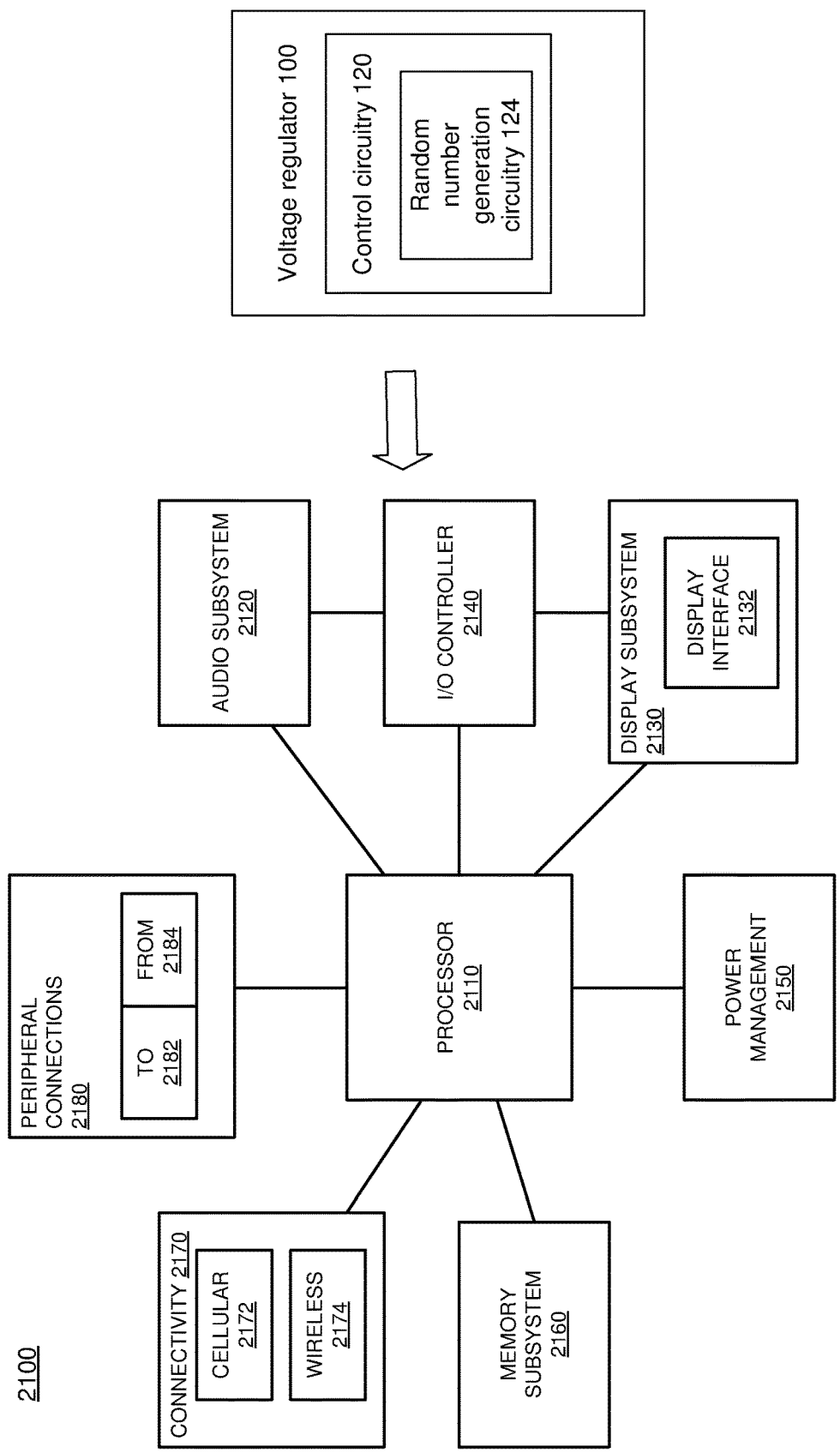
FIG. 9 illustrates a computer system, computing device or a SoC (System-on-Chip) comprising the VR discussed with respect to FIGS. 1-8, wherein the control circuitry of the VR comprises a random number generator circuitry to randomize at least a part of operation of the VR, e.g., to reduce effects of EMI and RFI emanating from the switching within the VR, according to some embodiments.

FIG. 9 illustrates a computer system, computing device or a SoC (System-on-Chip) 2100 comprises the VR 100 discussed with respect to FIGS. 1-8, wherein the control circuitry (e.g., control circuitry 120, 120a, 120b, 120c) of the VR 100 comprises the random number generator circuitry 124 to randomize at least a part of operation of the VR 100, e.g., to reduce effects of EMI and RFI emanating from the switching within the VR, according to some embodiments. It is pointed out that those elements of FIG. 9 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes a first processor 2110. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), Display- Port including MiniDisplayPort (MDP), High Definition Multimedia Interface (HDMI), Firewire, or other types.

In some embodiments, the computing device 2100 comprises the VR 100 discussed with respect to FIGS. 1-8, where the VR 100 comprises the control circuitry (e.g., control circuitry 120, 120*a*, 120*b*, 120*c*). The control circuitry of the VR 100 comprises the random number generator circuitry 124 to randomize at least a part of operation of the VR 100, e.g., to reduce effects of EMI and RFI emanating from the switching within the VR, as discussed with respect to FIGS. 1-8.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1

An apparatus comprising: at least two switches in series between an input voltage node and a ground terminal; an inductor coupled between a mid-point of the at least two switches and an output terminal; a first circuitry to compare a current through the inductor with a threshold current, and to control one or both of the at least two switches, based at least in part on the comparison; and a second circuitry to randomly vary the threshold current over consecutive cycles of switching of the at least two switches.

Example 2

The apparatus of example 1 or any other example, wherein: a load is coupled between the output terminal and the ground terminal; and the apparatus and the load are included in a same integrated circuit chip.

Example 3

The apparatus of example 1 or any other example, wherein the second circuitry is to randomly vary the threshold current within a range defined by a minimum threshold current and a maximum threshold current.

Example 4

The apparatus of example 3 or any other example, wherein the second circuitry comprises: a random number generator to generate a sequence of random numbers; a register to store a first measurement of the threshold current during a first cycle; a summation circuitry to generate a sum of the first measurement and a random number from the sequence; a multiplexer to receive: the sum from the summation circuitry, the minimum threshold current, and the maximum threshold current, wherein the multiplexer is to output one of: the sum, the minimum threshold current, and the maximum threshold current, and wherein the output of the multiplexer is to be used as the threshold current for a second cycle that occurs immediate subsequent to the first cycle.

Example 5

The apparatus of any of examples 1-4 or any other example, wherein the first circuitry is to: switch off a first switch of the at least two switches, based at least in part on the current through the inductor exceeding the threshold current.

Example 6

The apparatus of example 5 or any other example, wherein the first circuitry is to: switch on a second switch of the at least two switches, based at least in part on the current through the inductor exceeding the threshold current.

Example 7

The apparatus of any of examples 1-3 or any other example, further comprising: a third circuitry to compare an output voltage at the output terminal with a threshold voltage, and to control one or both of the at least two switches, based at least in part on the comparison; and a fourth circuitry to randomly vary the threshold voltage over consecutive cycles of switching of the at least two switches.

Example 8

The apparatus of example 7 or any other example, wherein the third circuitry comprises: a random number generator to generate a sequence of random numbers; a register to store a first measurement of the threshold voltage during a first cycle; a summation circuitry to generate a sum of the first measurement and a random number from the sequence; a multiplexer to receive: the sum from the summation circuitry, a minimum threshold voltage, and a maximum threshold voltage, wherein the multiplexer is to output one of: the sum, the minimum threshold voltage, and the maximum threshold voltage, and wherein the output of the multiplexer is to be used as the threshold voltage for a second cycle that occurs immediate subsequent to the first cycle.

Example 9

The apparatus of example 7 or any other example, wherein the third circuitry is to: switch on a first switch of the at least two switches, based at least in part on the output voltage reaching or becoming less than the threshold voltage.

Example 10

The apparatus of example 9 or any other example, wherein the first circuitry is to: switch off a second switch of the at least two switches, based at least in part on the output voltage becoming less than the threshold voltage.

Example 11

The apparatus of any of examples 1-4 or any other example, further comprising: a capacitor coupled between the output terminal and the ground terminal.

Example 12

The apparatus of any of examples 1-4 or any other example, wherein the second circuitry is to randomly vary the threshold current over consecutive cycles of switching of the at least two switches, such that an Electro-Magnetic Interference (EMI) generated due to switching the at least two switches are spread over a plurality of frequencies.

Example 13

A System on a Chip (SOC) comprising: a storage to store instructions; a processor coupled to the storage, the processor to execute the instructions; and a voltage regulator to supply an output voltage to one or both the processor or the storage, the voltage regulator comprising: a power stage comprising two or more switches, first one or more circuitries to randomly vary an upper trigger point (UTP) value and to randomly vary a lower trigger point (LTP) value, and second one or more circuitries to control switching of the two or more switches, based at least in part on the UTP value and the LTP value.

Example 14

The SOC of example 13 or any other example, wherein the first one or more circuitries comprise: a Linear Feedback Shift Register (LFSR) to generate a random number used to randomly vary one or both the UTP value or the LTP value.

Example 15

The SOC of example 13 or any other example, wherein the first one or more circuitries comprise: a random number generator to: receive one or more Least Significant Bits (LSBs) of a measurement of the output voltage, and generate a random number, based at least in part on the one or more LSBs of the measurement of the output voltage, wherein the random number is used to randomly vary one or both the UTP value or the LTP value.

Example 16

The SOC of any of examples 13-15 or any other example, wherein the second one or more circuitries comprises: a first comparator to compare the output voltage and the randomly varied UTP value, wherein the second one or more circuitries are to turn off a first switch in response to the output voltage reaching or exceeding the randomly varied UTP value; and a second comparator to compare the output voltage and the randomly varied LTP value, wherein the second one or more circuitries are to turn on the first switch in response to the output voltage reaching or becoming lower than the randomly varied LTP value.

Example 17

The SOC of any of examples 13-15 or any other example, further comprising: a wireless interface to allow the processor to communicate with another device.

Example 18

A voltage regulator comprising: a first transistor coupled between a supply rail and a node; a second transistor coupled between the node and a ground terminal; an inductor coupled between the node and an output terminal; a capacitor coupled between the output terminal and the ground terminal; and a circuitry to switch off the first transistor, in response to a current through the inductor reaching or exceeding a randomly or pseudo-randomly varying threshold.

Example 19

The voltage regulator of example 18 or any other example, wherein: a load is coupled between the output terminal and the ground terminal; and the voltage regulator and the load are included in an integrated circuit chip.

Example 20

The voltage regulator of example 18 or any other example, wherein: the circuitry is to switch on the first transistor, in response to a voltage at the output terminal reaching or becoming lower than another randomly or pseudo-randomly varying threshold.

Example 21

A method comprising: outputting an output voltage from a voltage regulator that comprises: at least two switches in series between an input voltage node and a ground terminal, and an inductor coupled between a mid-point of the at least two switches and an output terminal; comparing a current through the inductor with a threshold current; controlling one or both of the at least two switches, based at least in part on the comparison; and randomly varying the threshold current over consecutive cycles of switching of the at least two switches.

Example 22

The method of example 21 or any other example, further comprising: supplying the output voltage to a load is coupled between the output terminal and the ground terminal, wherein the voltage regulator and the load are included in a same integrated circuit chip.

Example 23

The method of any of examples 21-22 or any other example, wherein randomly varying the threshold current comprises: randomly varying the threshold current within a range defined by a minimum threshold current and a maximum threshold current.

Example 24

The method of any of examples 21-22 or any other example, further comprising: comparing the output voltage at the output terminal with a threshold voltage; controlling one or both of the at least two switches, based at least in part on the comparison; and randomly varying the threshold voltage over consecutive cycles of switching of the at least two switches.

Example 25

An apparatus comprising: means for performing the method of any of the examples 21-24 or any other example.

Example 26

One or more non-transitory computer-readable storage media to store instructions that, when executed by a processor, cause the processor to execute a method of any of the examples 21-24 or any other example.

Example 27

An apparatus comprising: means for outputting an output voltage from a voltage regulator that comprises: at least two switches in series between an input voltage node and a ground terminal, and an inductor coupled between a mid-point of the at least two switches and an output terminal; means for comparing a current through the inductor with a threshold current; means for controlling one or both of the at least two switches, based at least in part on the comparison; and means for randomly varying the threshold current over consecutive cycles of switching of the at least two switches.

Example 28

The apparatus of example 27 or any other example, further comprising: means for supplying the output voltage to a load is coupled between the output terminal and the ground terminal, wherein the voltage regulator and the load are included in a same integrated circuit chip.

Example 29

The apparatus of any of examples 27-28 or any other example, wherein the means for randomly varying the threshold current comprises: means for randomly varying the threshold current within a range defined by a minimum threshold current and a maximum threshold current.

Example 30

The apparatus of any of examples 27-28 or any other example, further comprising: means for comparing the output voltage at the output terminal with a threshold voltage; means for controlling one or both of the at least two switches, based at least in part on the comparison; and means for randomly varying the threshold voltage over consecutive cycles of switching of the at least two switches.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. An apparatus comprising:
   at least two switches in series between an input voltage node and a ground terminal;
   an inductor coupled between a mid-point of the at least two switches and an output terminal;
   a first circuitry to compare a current through the inductor with a threshold current, and to control one or both of the at least two switches, based at least in part on the comparison; and
   a second circuitry to randomly vary the threshold current over consecutive cycles of switching of the at least two switches.
2. The apparatus of claim 1, wherein:
   a load is coupled between the output terminal and the ground terminal; and
   the apparatus and the load are included in a same integrated circuit chip.
3. The apparatus of claim 1, wherein the second circuitry is to randomly vary the threshold current within a range defined by a minimum threshold current and a maximum threshold current.
4. The apparatus of claim 3, wherein the second circuitry comprises:
   a random number generator to generate a sequence of random numbers;
   a register to store a first measurement of the threshold current during a first cycle;
   a summation circuitry to generate a sum of the first measurement and a random number from the sequence;
   a multiplexer to receive: the sum from the summation circuitry, the minimum threshold current, and the maximum threshold current,
   wherein the multiplexer is to output one of: the sum, the minimum threshold current, and the maximum threshold current, and
   wherein the output of the multiplexer is to be used as the threshold current for a second cycle that occurs immediate subsequent to the first cycle.
5. The apparatus of claim 1, wherein the first circuitry is to:
   switch off a first switch of the at least two switches, based at least in part on the current through the inductor exceeding the threshold current.
6. The apparatus of claim 5, wherein the first circuitry is to:

switch on a second switch of the at least two switches, based at least in part on the current through the inductor exceeding the threshold current.

7. The apparatus of claim 1, further comprising:
a third circuitry to compare an output voltage at the output terminal with a threshold voltage, and to control one or both of the at least two switches, based at least in part on the comparison; and
a fourth circuitry to randomly vary the threshold voltage over consecutive cycles of switching of the at least two switches.

8. The apparatus of claim 7, wherein the third circuitry comprises:
a random number generator to generate a sequence of random numbers;
a register to store a first measurement of the threshold voltage during a first cycle;
a summation circuitry to generate a sum of the first measurement and a random number from the sequence;
a multiplexer to receive: the sum from the summation circuitry, a minimum threshold voltage, and a maximum threshold voltage,
wherein the multiplexer is to output one of: the sum, the minimum threshold voltage, and the maximum threshold voltage, and
wherein the output of the multiplexer is to be used as the threshold voltage for a second cycle that occurs immediate subsequent to the first cycle.

9. The apparatus of claim 7, wherein the third circuitry is to:
switch on a first switch of the at least two switches, based at least in part on the output voltage reaching or becoming less than the threshold voltage.

10. The apparatus of claim 9, wherein the first circuitry is to:
switch off a second switch of the at least two switches, based at least in part on the output voltage becoming less than the threshold voltage.

11. The apparatus of claim 1, further comprising:
a capacitor coupled between the output terminal and the ground terminal.

12. The apparatus of claim 1, wherein the second circuitry is to randomly vary the threshold current over consecutive cycles of switching of the at least two switches, such that an Electro-Magnetic Interference (EMI) generated due to switching the at least two switches are spread over a plurality of frequencies.

13. A System on a Chip (SOC) comprising:
a storage to store instructions;
a processor coupled to the storage, the processor to execute the instructions; and
a voltage regulator to supply an output voltage to one or both the processor or the storage, the voltage regulator comprising:
a power stage comprising two or more switches,
first one or more circuitries to randomly vary an upper trigger point (UTP) value and to randomly vary a lower trigger point (LTP) value, and
second one or more circuitries to control switching of the two or more switches, based at least in part on the UTP value and the LTP value.

14. The SOC of claim 13, wherein the first one or more circuitries comprise:
a Linear Feedback Shift Register (LFSR) to generate a random number used to randomly vary one or both the UTP value or the LTP value.

15. The SOC of claim 13, wherein the first one or more circuitries comprise:
a random number generator to:
receive one or more Least Significant Bits (LSBs) of a measurement of the output voltage, and
generate a random number, based at least in part on the one or more LSBs of the measurement of the output voltage,
wherein the random number is used to randomly vary one or both the UTP value or the LTP value.

16. The SOC of claim 13, wherein the second one or more circuitries comprises:
a first comparator to compare the output voltage and the randomly varied UTP value, wherein the second one or more circuitries are to turn off a first switch in response to the output voltage reaching or exceeding the randomly varied UTP value; and
a second comparator to compare the output voltage and the randomly varied LTP value, wherein the second one or more circuitries are to turn on the first switch in response to the output voltage reaching or becoming lower than the randomly varied LTP value.

17. The SOC of claim 13, further comprising:
a wireless interface to allow the processor to communicate with another device.

18. A voltage regulator comprising:
a first transistor coupled between a supply rail and a node;
a second transistor coupled between the node and a ground terminal;
an inductor coupled between the node and an output terminal;
a capacitor coupled between the output terminal and the ground terminal; and
a circuitry to switch off the first transistor, in response to a current through the inductor reaching or exceeding a randomly or pseudo-randomly varying threshold.

19. The voltage regulator of claim 18, wherein:
a load is coupled between the output terminal and the ground terminal; and
the voltage regulator and the load are included in an integrated circuit chip.

20. The voltage regulator of claim 18, wherein:
the circuitry is to switch on the first transistor, in response to a voltage at the output terminal reaching or becoming lower than another randomly or pseudo-randomly varying threshold.

* * * * *